United States Patent
Zhao et al.

(10) Patent No.: US 11,725,731 B2
(45) Date of Patent: Aug. 15, 2023

(54) TOOTHED METALLIC GASKET INTERPENETRATED WITH COMPRESSION-RESISTANT STEPS

(71) Applicant: ENVIRONMENTAL GASKET COMPANY, LTD., Jinagsu (CN)

(72) Inventors: Jingwei Zhao, Jinagsu (CN); Jun Zhang, Jinagsu (CN); Fan Yang, Jinagsu (CN)

(73) Assignee: ENVIRONMENTAL GASKET COMPANY, LTD., Jiangsu (CN)

( * ) Notice: Subject to any disclaimer, the term of this patent is extended or adjusted under 35 U.S.C. 154(b) by 162 days.

(21) Appl. No.: 17/149,876

(22) Filed: Jan. 15, 2021

(65) Prior Publication Data

US 2022/0228663 A1 Jul. 21, 2022

(51) Int. Cl.
*F16J 15/08* (2006.01)

(52) U.S. Cl.
CPC ................. *F16J 15/0818* (2013.01)

(58) Field of Classification Search
CPC .......... F16J 15/125; F16J 15/121; F16J 15/12; F16J 15/0818
See application file for complete search history.

(56) References Cited

U.S. PATENT DOCUMENTS

| | | | | |
|---|---|---|---|---|
| 1,776,140 A * | 9/1930 | Balfe | ...... | F16J 15/122 277/654 |
| 2,935,349 A * | 5/1960 | Burch | ...... | F16L 17/025 285/295.2 |
| 3,843,141 A * | 10/1974 | Kuhn | ...... | F16J 15/0818 123/193.3 |
| 3,914,490 A * | 10/1975 | Fusiek | ...... | F16J 15/122 277/654 |
| 4,373,735 A * | 2/1983 | Morsbach | ...... | F16J 15/122 277/592 |
| 5,702,111 A * | 12/1997 | Smith | ...... | F16J 15/123 277/944 |
| 5,927,723 A * | 7/1999 | Jung | ...... | F16L 23/18 277/572 |
| 9,551,422 B2 * | 1/2017 | Bond | ...... | F16J 15/121 |

(Continued)

FOREIGN PATENT DOCUMENTS

BR  102015028821 A2 *  5/2017  .......... F16J 15/0806
CN     203067774 U  *  7/2013

(Continued)

*Primary Examiner* — Eugene G Byrd
(74) *Attorney, Agent, or Firm* — Grogan, Tuccillo & Vanderleeden, LLP (57) ABSTRACT

A gasket includes a first face separated a predetermined distance from a second face, having a common though-hole. A metal frame is disposed between the first and the second faces, the metal frame supporting a first feature extending outwardly from opposing planar sides of the frame towards the first and the second faces, as well as supporting a second feature also extending outwardly from opposing planar sides of the frame towards the first and the second faces. The first feature is compressible when pressure is applied to the first and the second faces, and the second feature is incompressible when the pressure is applied to the first and the second faces. The first and the second features are continuous and concentrically aligned with one another about the through-hole, and the first feature is inclined towards the through-hole.

11 Claims, 5 Drawing Sheets

(56) References Cited

U.S. PATENT DOCUMENTS

| | | | |
|---|---|---|---|
| 10,107,400 B2* | 10/2018 | Lee .................. | F16J 15/104 |
| 10,544,864 B2* | 1/2020 | Natori ............... | F16J 15/108 |
| 11,125,364 B2* | 9/2021 | Briggs .............. | F16J 15/122 |
| 2004/0118510 A1* | 6/2004 | Pollock ............. | F16J 15/122 |
| | | | 156/289 |
| 2005/0116427 A1* | 6/2005 | Seidel ............... | F16L 23/18 |
| | | | 277/610 |
| 2005/0121859 A1* | 6/2005 | Seidel ............... | F16J 15/0881 |
| | | | 277/628 |
| 2010/0237570 A1* | 9/2010 | Ueda ................ | F16J 15/128 |
| | | | 277/608 |
| 2015/0316150 A1* | 11/2015 | Zhao ................ | F16J 15/0806 |
| | | | 277/648 |
| 2016/0305549 A1* | 10/2016 | Zhao ................ | F16J 15/122 |
| 2016/0348817 A1* | 12/2016 | Veiga ............... | F16J 15/065 |
| 2017/0138478 A1* | 5/2017 | Usuda .............. | F16J 15/0806 |
| 2017/0276249 A1* | 9/2017 | Kolb ................ | F16L 23/20 |
| 2018/0135754 A1* | 5/2018 | Veiga ............... | F16J 15/0818 |

FOREIGN PATENT DOCUMENTS

| | | | | |
|---|---|---|---|---|
| CN | 103644297 A | * | 3/2014 | ............ F16J 15/122 |
| CN | 103671918 A | * | 3/2014 | ............ F16J 15/122 |
| DE | 2437567 A | * | 2/1976 | ............ F16J 15/104 |
| DE | 4139453 A1 | * | 11/1991 | |
| JP | 2008261437 A | * | 10/2008 | |

* cited by examiner

TOOTHED METALLIC GASKET INTERPENETRATED WITH COMPRESSION-RESISTANT STEPS

FIELD OF THE INVENTION

The present invention relates, generally, to a seal gasket, and more particularly, to a toothed metallic gasket interpenetrated with compression-resistant steps.

BACKGROUND OF THE INVENTION

A conventional toothed gasket (for example, as disclosed in Patent Application No. DE2437567 entitled "Seal Gasket") is a gasket with triangular sharp toothed rings concentrically arranged on a metallic framework. The triangular sharp teeth and the metallic framework are integrated as a whole. Generally, several circles of concentric toothed rings, with an included angle of 90, are processed on two surfaces of a metallic flat gasket via precise lathes. The toothed rings are in sharp-corner contact with a flange face. The toothed gasket may be directly used as a metallic gasket, or processed into a composite gasket that has internal and external locating rings and is additionally laminated with flexible graphite or a polytetrafluoroethylene sealing element on two surfaces. Such toothed metallic gaskets have the following long-standing problems: the sharp corners will damage the flange sealing surface, and themselves are likely to be crushed and damaged; and, when the loading force applied to the gasket fluctuates or the precision of the flange declines, seal leakage is likely to result; this is particularly valid in the case of an excessive loading force being applied to the gasket, as there is no overload protection in this gasket design, seal failure often results from the crushing of or damage to the toothed rings due to over compression, and such failure is disastrous to the environment, safe production and personal safety.

The above design fails to take into account the previously mentioned likely possibility of gasket over compression, crushing of and damage to the toothed gasket sealing elements and, most importantly, how to prevent such a result. The external or internal locating rings are mainly for the purpose of radial and concentric locating with no special anti-crushing function and are in fixed locations, so not all teeth can be protected. However, for teeth that are arranged continuously, specific compression-resistant mechanisms interpenetrated between the continuous teeth are apparently required to ensure that each tooth will not be over-compressed, damaged or crushed. There should be an apparent distinction between the height of such compression-resistant mechanisms and the height of common teeth and locating rings. If the compression-resistant mechanisms are too high, the resilience will be influenced; and if the compression-resistant mechanisms are too low, they have no anti-crushing function.

SUMMARY OF THE INVENTION

To solve the deficiencies of the prior art and to have an essential difference from the above technology, an object of the present invention is to provide a toothed metallic gasket interpenetrated with compression-resistant steps, which has the advantages of safety in use and long-lasting and stable sealing performance even if the loading force applied to the gasket fluctuates and even in the case of overload.

The present invention employs the following technical solutions.

A toothed metallic gasket interpenetrated with compression-resistant steps is provided, comprising a metallic framework and metallic seal teeth arranged concentrically on upper and lower sides of the metallic framework. The metallic seal teeth and the metallic framework are integrated as a whole. Compression-resistant steps are provided on two sides of or between the concentrically arranged metallic seal teeth. The height of the compression-resistant steps is 30%-80% of that of the adjacent teeth, and is apparently higher than that of the metallic framework. Nonmetallic sealing material is filled between the compression-resistant steps and the adjacent teeth. The compression-resistant steps are not inclined, the tops of which are designed to be non-sharp contact corners.

Inclining towards a pressure source, the metallic seal teeth are inclined linear teeth, arc teeth, falcate teeth or combinations thereof, the tops of which are designed to be flat contact corners, arc contact corners or waved contact corners.

When a locating ring is provided on the outside of the gasket, the compression-resistant steps are provided on the locating ring, and the height of the compression-resistant steps is higher than that of the locating ring.

The compression-resistant steps are adjacent to one or more of the seal teeth, and one compression-resistant step is to be interpenetrated between every three seal teeth at most. The seal teeth beside the compression-resistant steps may be inclined or bent towards a pressure source, or arranged vertically.

The nonmetallic sealing material is covered on the seal teeth as a whole to form a nonmetallic sealing layer; or, the nonmetallic sealing material is not only filled between the compression-resistant steps and the adjacent teeth, but also covered on the seal teeth as a whole.

The present invention has the following advantages:

(1) the compression-resistant steps provided between the continuous teeth have a mechanism playing a special compression-resistant function, so that the gasket is protected from being crushed or damaged and the disastrous consequence due to seal failure is reduced greatly; (2) in a specially designed height, the compression-resistant steps can ensure that the seal teeth are maintained within an optimal elastic range without crushing, so that the life span of the seal and the ability to adapt to changes of the working environments of the gasket are improved obviously; (3) a design in which one compression-resistant step should be interpenetrated between every three seal teeth at most ensures that all seal teeth are stressed evenly and thus protected in the case of uneven flange sealing surface and non-uniform pressure; (4) the tops of the compression-resistant steps are designed to be flat contact corners, arc contact corners or waved contact corners, so that the flange will not be damaged; and, (5) if the pre-tightening force is too large and when the seal teeth have been flattened and are likely to lose efficacy, the several circles of compression-resistant steps distributed between the seal teeth may be in contact with the flange sealing surface; furthermore, in the case that the nonmetallic material between the seal teeth and the flange is squeezed out, spare seal lines for providing additional sealing performance may be formed on the tops of the compression-resistant steps in flat contact corners, arc contact corners or waved contact corners, so that a secondary compression-resistant and seal protection mechanism is obtained.

DETAILED DESCRIPTION OF THE INVENTION

Figure 1:
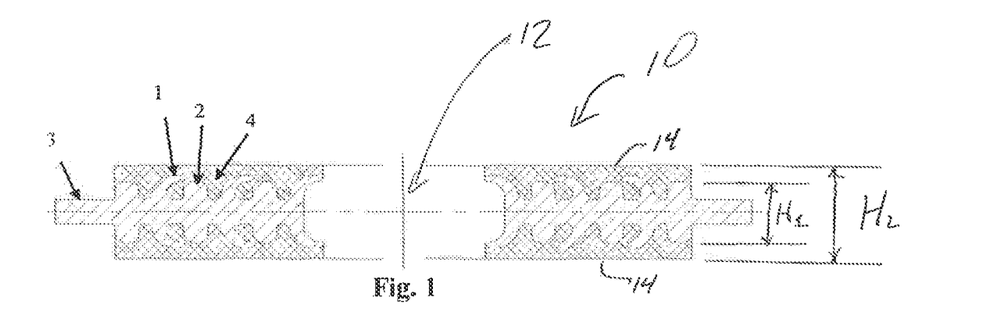
FIG. 1 is a schematic diagram of a toothed metallic gasket with falcate seal teeth, interpenetrated with compression-resistant steps, according to one embodiment of the present invention.

A toothed metallic gasket 10 according to one embodiment of the present invention is shown in FIG. 1, interpenetrated with a first feature comprising compression-sensitive steps/ribs, as well as a second feature comprising compression-resistant steps/ribs. As shown in FIG. 1, compression-sensitive seal teeth 1, are shown in cross-section as alternating and being concentrically aligned with compression-resistant steps 2. Both the compression-sensitive seal teeth 1 and the compression resistant stop-steps 2 are formed as continuous rings, on opposing faces of a metallic framework 3 of the gasket, extending outwardly therefrom, and towards the opposing faces 14 of the toothed metal gasket 10. The contact surface of the compression-resistant steps 2 and a flange is planar, and the center line of the contact surface is vertical to the ring surface. The height of the compression-resistant steps 2 is lower than that of the adjacent seal teeth 1, but higher than that of the metallic framework of the gasket/external locating ring 3. One compression-resistant step 2 is to be provided between every three seal teeth 1 at most, in accordance with one embodiment of the present invention. As will be appreciated, the arrangement and structure of the compression-resistant steps 2 and the seal teeth 1 may be configured flexibly depending on practical applications, without departing from the broader aspects of the present invention.

As will be readily appreciated by a review of the toothed metallic gasket 10 shown in FIG. 1, each of the seal teeth 1 and the compression-resistant steps 2 form discrete, continuous and concentrically aligned, or nested, rings/ribs. As will be further appreciated, the concentrically-aligned rings of seal teeth 1 and compression-resistant steps 2 are themselves substantially centered about a through-hole 12, the area of the through-hole 12 acting as a pressure source when a liquid or gaseous fluid is conducted via the through-hole 12.

Figure 2:
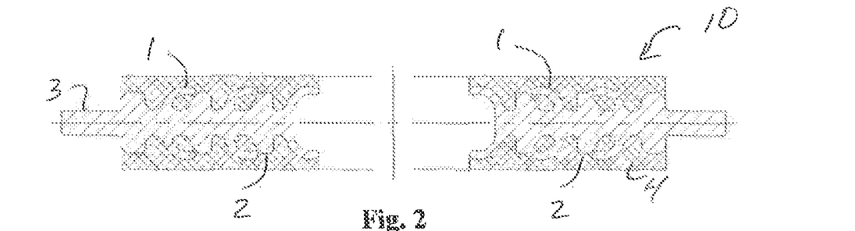
FIG. 2 is a schematic diagram of a toothed metallic gasket with arc seal teeth, interpenetrated with compression-resistant steps, according to another embodiment of the present invention.
Figure 3:
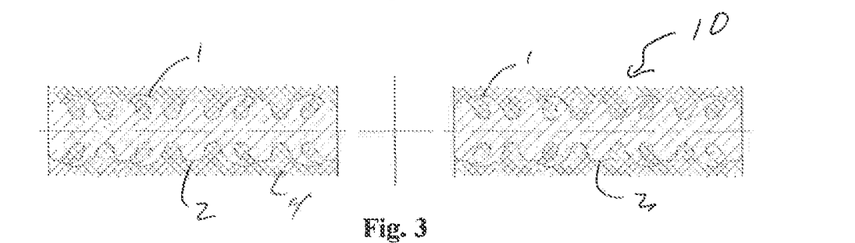
FIG. 3 is a schematic diagram of a toothed metallic gasket with bidirectional falcate seal teeth, interpenetrated with compression-resistant steps, according to another embodiment of the present invention.
Figure 4:
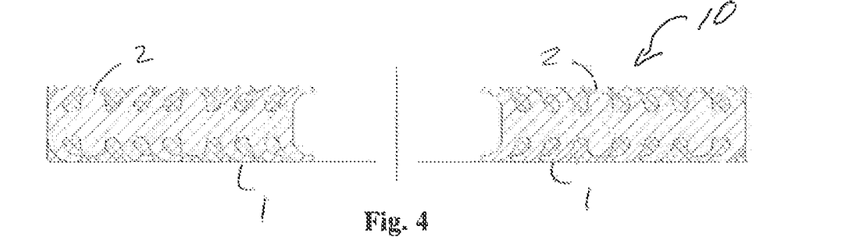
FIG. 4 is a schematic diagram of a toothed metallic gasket with falcate seal teeth in a 1+1+2+1+3 combination way, interpenetrated with compression-resistant steps, according to another embodiment of the present invention.
Figure 5:
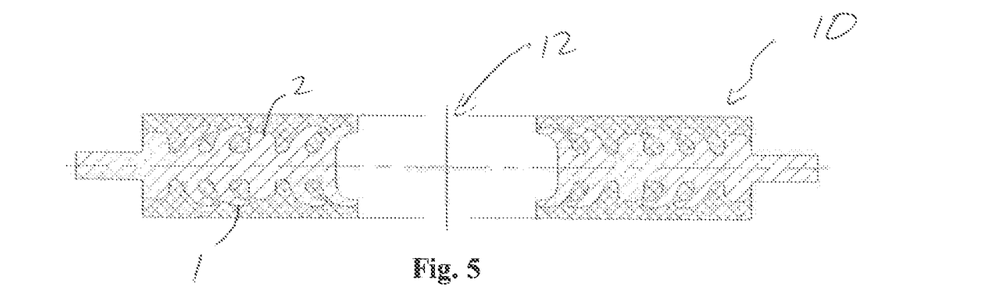
FIG. 5 is a schematic diagram of a toothed metallic gasket with falcate seal teeth in a 1+2+1+2 combination way, interpenetrated with compression-resistant steps, according to another embodiment of the present invention.
Figure 6:
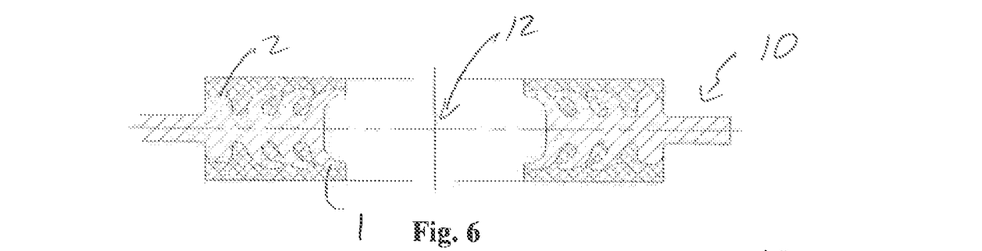
FIG. 6 is a schematic diagram of a toothed metallic gasket with falcate seal teeth in a 1+3 combination way, interpenetrated with compression-resistant steps, according to another embodiment of the present invention.
Figure 7:
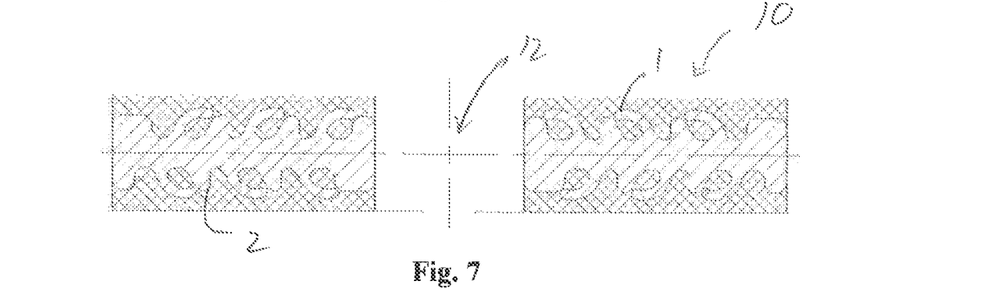
FIG. 7 is a schematic diagram of a toothed metallic gasket with arc seal teeth in a staggered way, interpenetrated with compression-resistant steps, according to another embodiment of the present invention.
Figure 8:
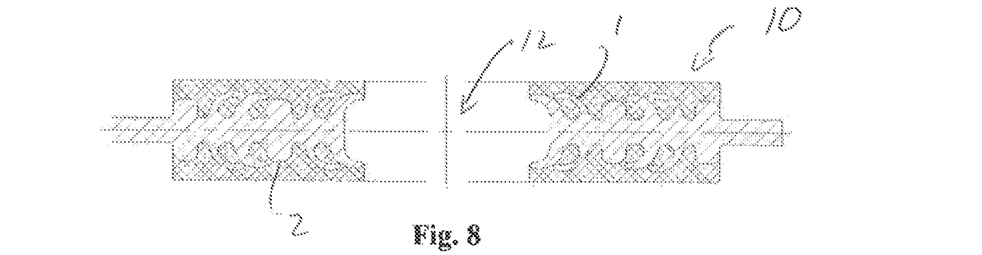
FIG. 8 is a schematic diagram of a toothed metallic gasket with falcate and arc seal teeth, interpenetrated with compression-resistant steps, according to another embodiment of the present invention.
Figure 9:
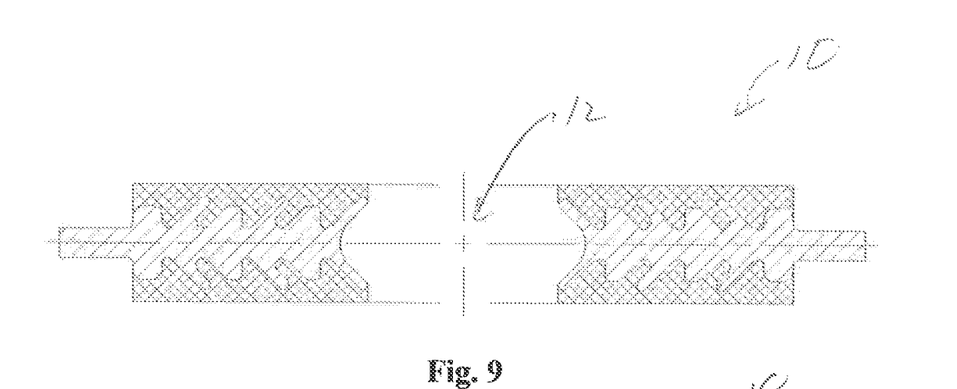
FIG. 9 is a schematic diagram of a toothed metallic gasket with inclined seal teeth, interpenetrated with compression-resistant steps, according to another embodiment of the present invention.
Figure 10:
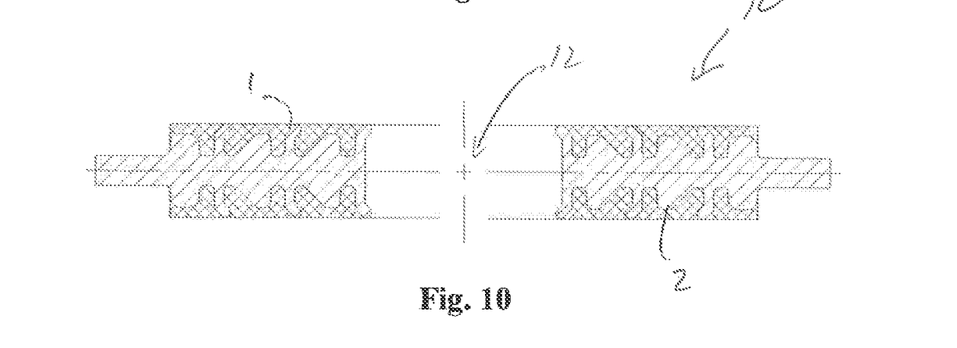
FIG. 10 is a schematic diagram of a toothed metallic gasket with seal teeth from straight to inclined, interpenetrated with compression-resistant steps, according to another embodiment of the present invention.

As also shown in FIG. 1, in the toothed metallic gasket interpenetrated with compression-resistant steps, each of the seal teeth 1, designed to be falcate, is provided with a compression-resistant step 2 in the middle, and nonmetallic material 4, such as graphite, is filled between the compression-resistant steps 2 and the seal teeth. In FIG. 2, the seal teeth are designed to be generally arc-shaped, and the compression-resistant steps are designed to be trapezoidal. In FIG. 3, the seal teeth of this gasket are in an inverse design, with some of the seal teeth being generally arched, or inclined, towards the through-hole 12, and some inclined in an opposing direction. In FIG. 4, the seal teeth and compression-resistant steps are combined in a way of 1+1+2+1+3, and are shown that the contact surface between the seal teeth and the flange is a chambered surface when the nonmetallic sealing material is squeezed out. In FIG. 5, the seal teeth and compression-resistant steps are combined in a way of 1+2+1+2, and are shown that clearances between the teeth are filled with the nonmetallic sealing material. In FIG. 6, the seal teeth and compression-resistant steps are combined in a way of 1+3. In FIG. 7, the seal teeth and the compression-resistant steps are staggered up and down. In FIG. 8, different seal teeth and the compression-resistant steps are combined. In FIG. 9, the seal teeth of this gasket are designed to be inclined. In FIG. 10, the seal teeth of this gasket are designed to be inclined from straight.

Compared with the prior art, the present invention has two advantages essentially: first, the compression-resistant steps provided for this gasket may ensure that the seal teeth obtain uniform enough seal compression and resilience, thereby solving the long-standing problem in toothed metallic gaskets that the metallic seal teeth are likely to be crushed and damaged due to an excessive loading force resulting in seal failure; and second, in the case that the nonmetallic material between the seal teeth and the flange is squeezed out, the compression-resistant steps of this gasket can still retain a nonmetallic seal which provides an additional secondary compression-resistant and seal protection mechanism for the gasket. As a supplementary design feature, in the case that the seal teeth are inclined teeth, the compression-resistant steps further can retain tension to maintain an elastic seal. Compared with the previous designs, with the advantages and combinations thereof as described above, the sealing reliability and safety in use of the gasket are guaranteed and improved greatly.

While differing embodiments of the toothed metallic gasket 10 have been described in connection with FIGS. 1-10, it will be readily appreciated that additional features and considerations are also contemplated by the present invention.

Indeed, the alternative embodiments shown in FIGS. 1-10 include the use of non-metallic sealing material 4 between the various seal teeth 1 and compression-resistant stop-steps 2, in combination with forming the tops of the stop-steps 2 and the seal teeth 1 to be flattened, arc-shaped or rounded. In this manner, the embodiments of FIGS. 1-10 exhibit effective compression resistance while also ensuring against any damage to the toothed metallic gasket 10 itself. As previously noted, such alternative arrangements are effective even when the seal teeth 1 are themselves arranged vertically.

FIGS. 11-14 express additional alternative embodiments of the present invention, whereby advantageous compression resistance is effectuated primarily by ensuring a preferred range of structural inclination to the seal teeth, while also maintaining a predetermined dimensional relationship between the seal teeth 1 and the compression-resistant stop-steps 2, with or without the inclusion of the non-metallic sealing material 4.

While the embodiments in FIGS. 11-14 may each illustrate distinct features and structural relationships of the toothed metallic gasket of the present invention, it will be readily appreciated by one of ordinary skill that a toothed metallic gasket according to the present invention may evidence only one, or a combination of more than one, of the features and/or structural relationships illustrated in FIGS. 11-14, without departing from the broader aspects of the present invention.

Figure 11:
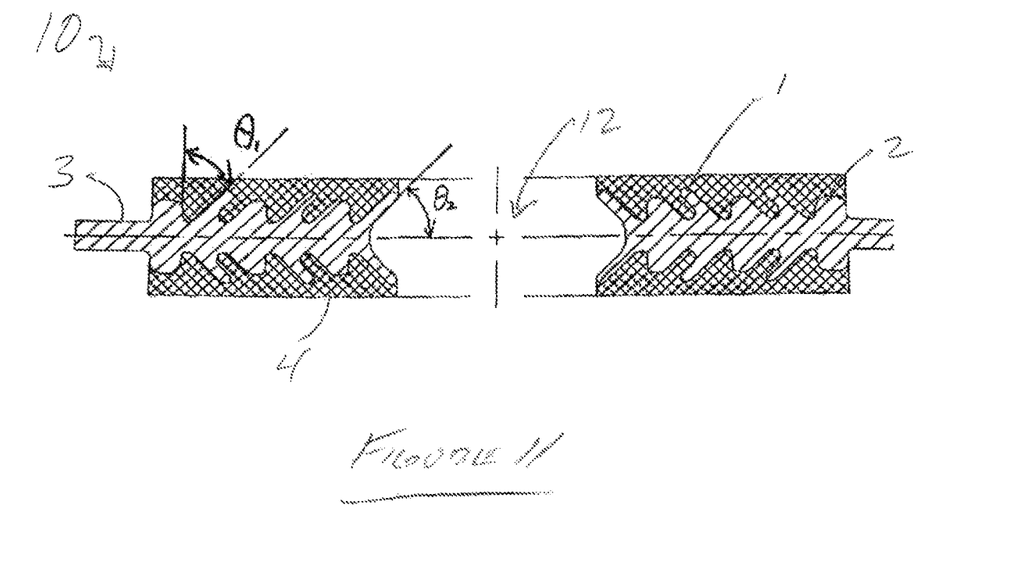
FIG. 11 is a schematic diagram of a toothed metallic gasket with seal teeth, depicting a preferred angle of inclination the integrated seal teeth, according to another embodiment of the present invention.

FIG. 11 illustrates a preferred range for the angle of inclination of the seal teeth 1, according to another embodiment of the present invention. As shown in FIG. 11, the toothed metallic gasket 10 includes a plurality of seal teeth 1 that are inclined towards the through-hole 12 at an angle, $\theta_1$, that is preferably between 15-60°. As will be appreciated, if the angle of inclination $\theta_1$ is too small, the seal teeth would require undue force to compress, and thus impede an effective operation of the toothed metallic gasket 10. Moreover, if the angle of inclination $\theta_1$ was too great, the seal teeth would be too easily overwhelmed, and would thus again impede an effective operation of the toothed metallic gasket 10. Likewise, as is also shown in FIG. 11, the preferred range of complimentary angles, $\theta_2$, as it relates to a chosen $\theta_1$ angle within the range of 15-60°, is between 50-85°.

As will be appreciated, orienting the angle of inclination of the seal teeth 1 to be within the preferred range of 15-60°, as shown in FIG. 11, is effective in absorbing compressive forces acting on the toothed metallic gasket 10, with or without the presence of the non-metallic sealing material 4. Indeed, by orienting the angle of inclination of the seal teeth 1 to be within the preferred range of 15-60°, a wider range of potential material, including fluids and dry-compositions, may be alternatively utilized in place of the non-metallic sealing material 4, without departing from the broader aspects of the present invention.

Moreover, while the seal teeth 2 shown in FIG. 11 are shown as being generally linear and of uniform cross-sectional thickness, it will be readily appreciated that the seal teeth 2 of FIG. 11 may alternatively evidence a non-linear arc profile, as shown in the embodiments of FIGS. 1-10, and/or also evidence a tapering of the cross-sectional thickness of each of the seal teeth 2, from its base to tip, without departing from the broader aspects of the present invention.

Figure 12:
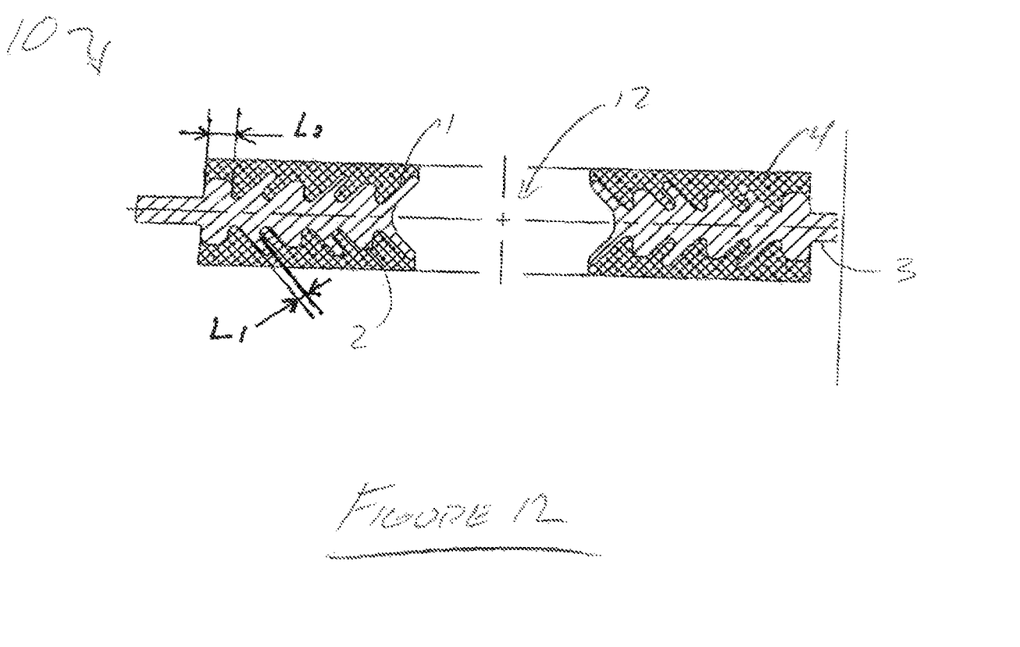
FIG. 12 is a schematic diagram of a toothed metallic gasket with seal teeth, depicting a preferred cross-sectional thickness of the integrated compression-resistant steps as compared to the preferred cross-sectional thickness of the seal teeth, according to another embodiment of the present invention.

FIG. 12 depicts a preferred cross-sectional thickness, $L_2$, of the integrated compression-resistant stop-steps 2, as compared to the preferred cross-sectional thickness, $L_1$, of the seal teeth 1, according to another embodiment of the present invention. As shown in FIG. 12, the thickness, $L_2$, of the compression-resistant stop-steps 2 is preferrable at least 2 times the thickness, $L_1$, of the seal teeth 1. This 2:1 ratio between thicknesses $L_2$ and $L_1$ ensures that the toothed metallic gasket 10 achieves optimum effectiveness in compressibility, while retaining essential resistance to compressive forces.

As will be appreciated, ensuring at least a 2:1 ratio between the cross-sectional thickness, $L_2$, of the integrated compression-resistant stop-steps 2, and the cross-sectional thickness, $L_1$, of the seal teeth 1, as shown in FIG. 12, is effective in absorbing compressive forces acting on the toothed metallic gasket 10, with or without the presence of the non-metallic sealing material 4. Indeed, by ensuring at least a 2:1 ratio between the cross-sectional thickness, $L_2$, of the integrated compression-resistant stop-steps 2, and the cross-sectional thickness, $L_1$, of the seal teeth 1, a wider range of potential material, including fluids and dry-compositions, may be alternatively utilized in place of the non-metallic sealing material 4, without departing from the broader aspects of the present invention.

Still further, it will be appreciated that a toothed metallic gasket 10 that expresses one or more of the attributes of: (1) orienting the angle of inclination of the seal teeth 1 to be within the preferred range of 15-60°, and, (2) ensuring at least a 2:1 ratio between the cross-sectional thickness, $L_2$, of the integrated compression-resistant stop-steps 2, and the cross-sectional thickness, $L_1$, of the seal teeth 1, will produce a toothed metallic gasket 10 having even greater compression resistance, and experiencing less operational damage over time.

Figure 13:
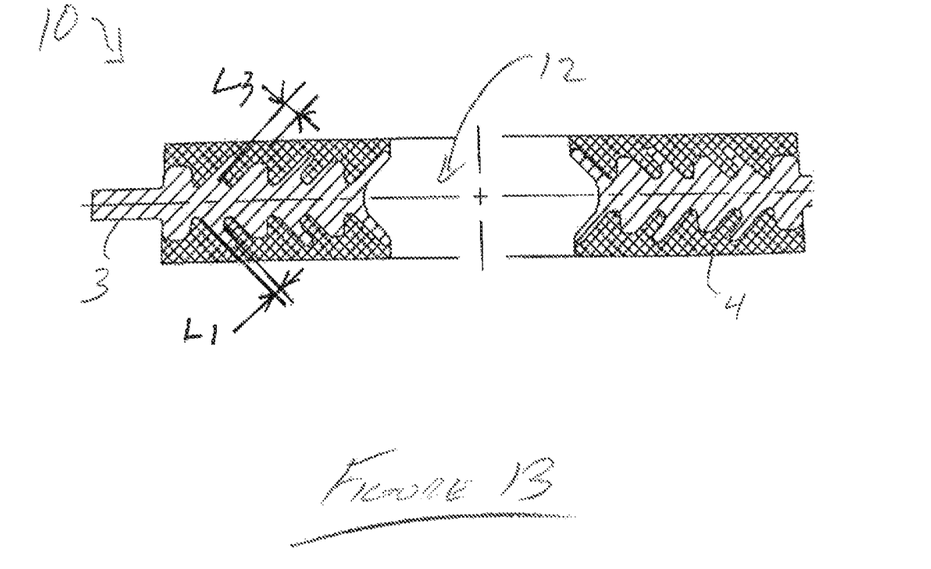
FIG. 13 is a schematic diagram of a toothed metallic gasket with seal teeth, depicting a preferred distance between the integrated compression-resistant steps and adjacent seal teeth, according to another embodiment of the present invention.

FIG. 13 depicts a preferred spacing, $L_3$, between the integrated compression-resistant stop-steps 2 and adjacent seal teeth 2, as compared to the preferred cross-sectional thickness, $L_1$, of the seal teeth 1, according to another embodiment of the present invention. As shown in FIG. 13, the spacing, or distance, $L_3$, between the integrated compression-resistant stop-steps 2 and adjacent seal teeth 2 is preferably at least 2 times (i.e., at least twice) the thickness $L_1$, of the seal teeth 1. Providing this minimum 2:1 ratio ensures that seal teeth 1 of the toothed metallic gasket 10 are able to have enough space relative to adjacent stop-steps, to effectively compress and thereby achieve optimum sealing.

As will be appreciated, ensuring a 2:1 ratio of the spacing, $L_3$, between the integrated compression-resistant stop-steps 2 and adjacent seal teeth 2, as compared to the preferred cross-sectional thickness, $L_1$, of the seal teeth 1, as shown in FIG. 13, is effective in absorbing compressive forces acting on the toothed metallic gasket 10, with or without the presence of the non-metallic sealing material 4. Indeed, by ensuring at least a 2:1 ratio of the spacing, $L_3$, between the integrated compression-resistant stop-steps 2 and adjacent seal teeth 2, as compared to the preferred cross-sectional thickness, $L_1$, of the seal teeth 1, a wider range of potential material, including fluids and dry-compositions, may be alternatively utilized in place of the non-metallic sealing material 4, without departing from the broader aspects of the present invention.

Still further, it will be appreciated that a toothed metallic gasket 10 that expresses one or more of the attributes of: (1) orienting the angle of inclination of the seal teeth 1 to be within the preferred range of 15-60°, and, (2) ensuring at least a 2:1 ratio between the cross-sectional thickness, $L_2$, of the integrated compression-resistant stop-steps 2, and the cross-sectional thickness, $L_1$, of the seal teeth 1, as well as, (3) ensuring at least a 2:1 ratio of the spacing, $L_3$, between the integrated compression-resistant stop-steps 2 and adjacent seal teeth 2, as compared to the preferred cross-sectional thickness, $L_1$, of the seal teeth 1, will produce a toothed metallic gasket 10 having even greater compression resistance, and experiencing less operational damage over time.

Figure 14:
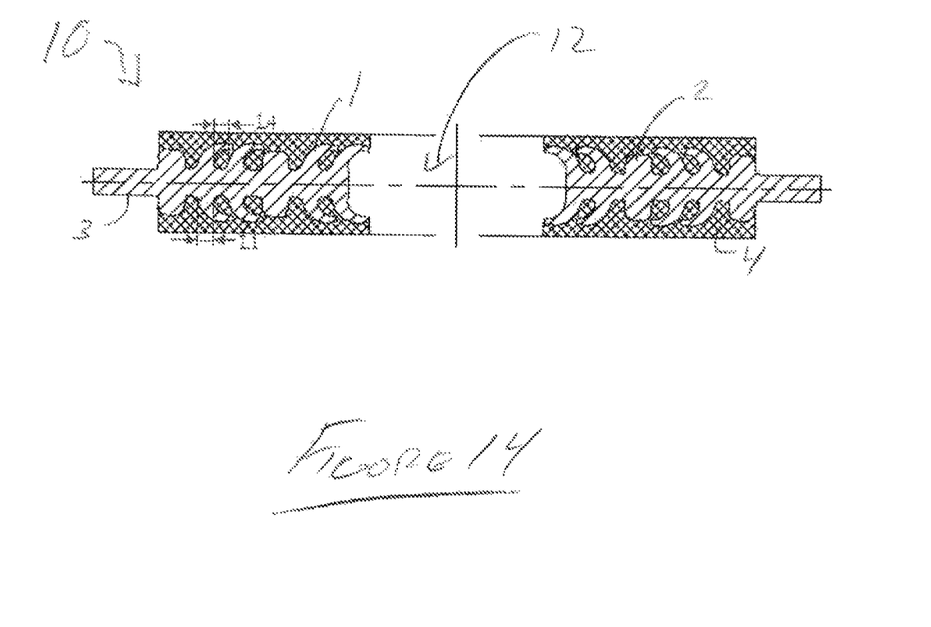
FIG. 14 is a schematic diagram of a toothed metallic gasket with seal teeth, depicting a preferred distance between adjacent seal teeth, according to another embodiment of the present invention.

For its part, FIG. 14 depicts a preferred spacing, $L_4$, between adjacent seal teeth 2, as compared to the preferred cross-sectional thickness, $L_1$, of the seal teeth 1, according to another embodiment of the present invention. As shown in FIG. 14, the spacing, or distance, $L_4$, between adjacent seal teeth 2 is preferably between 1 to 3 times the thickness $L_1$, of the seal teeth 1. Providing this range ensures that seal teeth 1 of the toothed metallic gasket 10 are able to have enough space relative to adjacent seal teeth to effectively compress and thereby achieve optimum sealing, without crushing into one another, and without being so close together that machine of the same becomes problematic, costly and unreliable.

As will be appreciated, ensuring that the spacing, or distance, $L_4$, between adjacent seal teeth 2 is preferably between 1 to 3 times the thickness $L_1$, of the seal teeth 1, as shown in FIG. 14, is effective in absorbing compressive forces acting on the toothed metallic gasket 10, with or without the presence of the non-metallic sealing material 4. Indeed, by ensuring that the spacing, or distance, $L_4$, between adjacent seal teeth 2 is preferably between 1 to 3 times the thickness $L_1$, of the seal teeth 1, a wider range of potential material, including fluids and dry-compositions, may be alternatively utilized in place of the non-metallic sealing material 4, without departing from the broader aspects of the present invention.

Still further, it will be appreciated that a toothed metallic gasket 10 that expresses one or more of the attributes of: (1) orienting the angle of inclination of the seal teeth 1 to be within the preferred range of 15-60° (as depicted in the embodiment of FIG. 11), and, (2) ensuring at least a 2:1 ratio between the cross-sectional thickness, $L_2$, of the integrated compression-resistant stop-steps 2, and the cross-sectional thickness, $L_1$, of the seal teeth 1 (as depicted in the embodiment of FIG. 12), and, (3) ensuring at least a 2:1 ratio of the spacing, $L_3$, between the integrated compression-resistant stop-steps 2 and adjacent seal teeth 2, as compared to the preferred cross-sectional thickness, $L_1$, of the seal teeth 1 (as depicted in the embodiment of FIG. 13), as well as (4) ensuring that the spacing, or distance, $L_4$, between adjacent seal teeth 2 is preferably between 1 to 3 times the thickness $L_1$, of the seal teeth 1 (as depicted in the embodiment of FIG. 14), will produce a toothed metallic gasket 10 having even greater compression resistance, and experiencing less operational damage over time.

Turning again to the toothed metallic gasket 10 shown in FIG. 1, the height, $H_1$, of the compression-resistant stop-steps 2 is preferably at least 60-90% of the height/distance, $H_2$, defined between the opposing faces 14 of the toothed metallic gasket 10. As shown in FIG. 1, the height, $H_1$, of the stop-steps 2 must be greater than the height/thickness of the ring 3, which is itself typically at least 50% of the thickness, $H_2$, but no more than 90% of the thickness, $H_2$, in order to provide suitable compression characteristics.

Still further, it will be appreciated that a toothed metallic gasket 10 that expresses one or more of the attributes of: (1) orienting the angle of inclination of the seal teeth 1 to be within the preferred range of 15-60° (as depicted in the embodiment of FIG. 11), and, (2) ensuring at least a 2:1 ratio between the cross-sectional thickness, $L_2$, of the integrated compression-resistant stop-steps 2, and the cross-sectional thickness, $L_1$, of the seal teeth 1 (as depicted in the embodiment of FIG. 12), and, (3) ensuring at least a 2:1 ratio of the spacing, $L_3$, between the integrated compression-resistant stop-steps 2 and adjacent seal teeth 2, as compared to the preferred cross-sectional thickness, $L_1$, of the seal teeth 1 (as depicted in the embodiment of FIG. 13), and (4) ensuring that the spacing, or distance, $L_4$, between adjacent seal teeth 2 is preferably between 1 to 3 times the thickness $L_1$, of the seal teeth 1 (as depicted in the embodiment of FIG. 14), as well as (5) ensuring the height, $H_1$, of the compression-resistant stop-steps 2 is preferably at least 60-90% of the height/distance, $H_2$, defined between the opposing faces 14 of the toothed metallic gasket 10 (as depicted in the embodiment of FIG. 1), will produce a toothed metallic gasket 10 having even greater compression resistance, and experiencing less operational damage over time.

As will also be appreciated, and similar to the seal teeth shown in the embodiments of FIGS. 1-10, the metallic seal teeth shown in 11-14 are inclined towards a pressure source. Moreover, the inclined, metallic seal teeth of FIGS. 11-14 may be linear teeth, arc teeth, falcate teeth or combinations thereof, the tops of which are designed to be flat contact corners, arc contact corners or waved contact corners.

Moreover, as generally shown in the embodiments of FIGS. 1-14, the seal teeth 2 may be either generally linear and of uniform cross-sectional thickness, or alternatively, the seal teeth 2 may evidence a non-linear arc profile, and/or also evidence a tapering of the cross-sectional thickness of each of the seal teeth 2, from its base to tip, without departing from the broader aspects of the present invention.

Although this invention has been shown and described with respect to the detailed embodiments thereof, it will be understood by those of skill in the art that various changes may be made, and equivalents may be substituted for elements thereof without departing from the scope of the invention. In addition, modifications may be made to adapt a particular situation or material to the teachings of the invention without departing from the essential scope thereof. Therefore, it is intended that the invention is not limited to the particular embodiments disclosed in the above detailed description, but that the invention will include all embodiments falling within the scope of this disclosure.

What is claimed is:
1. A gasket, comprising:
a first face separated a predetermined distance from a second face, said first and said second faces being substantially co-planar with one another and defining a common though-hole;
a metal frame disposed between said first and said second faces, said metal frame supporting a first feature extending outwardly from opposing planar sides of said frame towards said first and said second faces and defining thereby a first feature height, as well as supporting a second feature also extending outwardly from opposing planar sides of said frame towards said first and said second faces and defining thereby a second feature height;

said first feature being compressible when pressure is applied to said first and said second faces, and said second feature being incompressible when said pressure is applied to said first and said second faces; and wherein said first and said second features are continuous and concentrically aligned with one another about said through-hole, said first feature being inclined towards said through-hole at an angle of between 15-60°.

2. The gasket according to claim 1, wherein:
said second feature is at least 2 times as thick in cross section, as said first feature.

3. The gasket according to claim 1, wherein:
said first feature includes a pair of concentrically aligned ribs, each of said ribs being separated from one another by a distance that is between 1 to 3 times the cross-sectional thickness of said first feature.

4. The gasket according to claim 1, wherein:
said second feature height is between 60-90% of said predetermined distance between said first and said second faces.

5. A gasket, comprising:
a first face separated a predetermined distance from a second face, said first and said second faces defining a common though-hole;
a frame disposed between said first and said second faces, said frame supporting a first feature extending outwardly from opposing planar sides of said frame towards said first and said second faces and defining thereby a first feature height, as well as supporting a second feature also extending outwardly from opposing planar sides of said frame towards said first and said second faces and defining thereby a second feature height;
said first feature being compressible when pressure is applied to said first and said second faces, and said second feature being incompressible when said pressure is applied to said first and said second faces; and
wherein said second feature height is between 60-90% of said predetermined distance between said first and said second faces.

6. The gasket according to claim 5, wherein:
said second feature is at least 2 times as thick in cross section, as said first feature.

7. The gasket according to claim 5, wherein:
said first feature and said second feature are concentrically separated from one another by a distance that is at least 2 times the cross-sectional thickness of said first feature.

8. The gasket according to claim 5, wherein:
said first feature includes a pair of concentrically aligned ribs, each of said ribs being separated from one another by a distance that is between 1 to 3 times the cross-sectional thickness of said first feature.

9. The gasket according to claim 5, wherein:
said first and said second features are continuous and concentrically aligned with one another about said through-hole, said first feature being inclined towards said through-hole at an angle of between 15-60°.

10. A method of forming a compression-resistant gasket, said method comprising the steps of:
orientating a first face to be a predetermined distance from a second face, said first and said second faces defining a common though-hole;
disposing a frame between said first and said second faces, said frame supporting a first feature extending outwardly from opposing planar sides of said frame towards said first and said second faces and defining thereby a first feature height, as well as supporting a second feature also extending outwardly from opposing planar sides of said frame towards said first and said second faces and defining thereby a second feature height;
designing said first feature to be compressible when pressure is applied to said first and said second faces, and designing said second feature to be incompressible when said pressure is applied to said first and said second faces; and
ensuring that said second feature height is between 60-90% of said predetermined distance between said first and said second faces.

11. A gasket, comprising:
a first face separated from a second face, said first and said second faces being substantially co-planar with one another;
a metal frame disposed between said first and said second faces, said metal frame
a compressional tooth extending outwardly from opposing planar sides of said frame towards said first and said second faces and defining thereby a first feature height;
a compression-resistant rib also extending outwardly from opposing planar sides of said frame towards said first and said second faces and defining thereby a second feature height;
said compressional tooth being compressible when pressure is applied to said first and said second faces, and said compression-resistant rib being substantially incompressible when said pressure is applied to said first and said second faces; and
wherein said compressional tooth is inclined at an angle of between 15-60° and
wherein said compression-resistant rib is at least 2 times as thick in cross-section as said compressional tooth.

* * * * *